United States Patent [19]

Guile et al.

[11] Patent Number: 4,960,737

[45] Date of Patent: Oct. 2, 1990

[54] CALCIUM DIALUMINATE/HEXALUMINATE CERAMIC STRUCTURES

[75] Inventors: Donald L. Guile, Horseheads; Dandy Martin, Corning, both of N.Y.

[73] Assignee: Corning Incorporated, Corning, N.Y.

[21] Appl. No.: 241,914

[22] Filed: Sep. 6, 1988

[51] Int. Cl.$^5$ .............................................. C04B 35/44
[52] U.S. Cl. .................................... 501/125; 501/123; 501/127; 501/153; 210/510.1; 210/500.21; 210/503; 502/341; 502/439; 502/527
[58] Field of Search .............. 501/123, 125, 153, 127; 210/510.1, 500.21, 503; 502/341, 439, 527

[56] References Cited

U.S. PATENT DOCUMENTS

| | | | |
|---|---|---|---|
| 3,247,001 | 4/1966 | Alper | 501/125 |
| 3,312,558 | 4/1967 | Miller | 501/125 |
| 3,969,542 | 7/1976 | Tomita et al. | 502/250 |
| 4,495,302 | 1/1985 | Taylor et al. | 501/125 |

*Primary Examiner*—Karl Group
*Attorney, Agent, or Firm*—Suzanne E. Miller; Richard N. Wardell

[57] ABSTRACT

Novel calcium dialuminate/hexaluminate ceramic structures in the form of blends, laminates and composites, and processes for making these structures are disclosed. The ceramics of the invention exhibit relatively lower levels of thermal expansion, high strengths, and good thermal shock resistance over wide temperature ranges.

41 Claims, No Drawings

CALCIUM DIALUMINATE/HEXALUMINATE CERAMIC STRUCTURES

BACKGROUND OF THE INVENTION

The present invention pertains to novel calcium dialuminate and hexaluminate ceramic structures in the form of blends, laminates and composites. The ceramics of the invention exhibit relatively low levels of thermal expansion, high strengths and good thermal shock resistance over wide temperature ranges.

Due to properties such as general strength, chemical inertness, temperature stability and electrical and thermal insulating capacity, ceramics have enjoyed wide commercial usage. Such applications include cookware, spark plug insulators, abrasive wheels, refractory linings, chemical processing, heat exchangers, filters, and automotive substrates, to name a few. However, many of the ceramic materials currently employed do not capably operate in extremely high temperature environments, such as above 1500° C., or in environments where exposure to very large thermal gradients, such as between 25° C. and 1700° C., is required. Other ceramic materials capable of operating in such harsh environments need to be developed. The present invention is directed to this end.

SUMMARY OF THE INVENTION

The present invention is directed to novel calcium dialuminate and hexaluminate ceramic structures and processes for making the same. These structures are comprised of compositions, which are in the form of blends, laminates and composites, and exhibit relatively low levels of thermal expansion, high strengths and good thermal shock resistance over wide temperature ranges.

Specifically, the present invention provides a structure comprised of calcium dialuminate and hexaluminate crystalline phases about 75-10% by weight calcium dialuminate and about 25-90% by weight calcium hexaluminate, wherein a single or a plurality of dialuminate zones are positionally juxtaposed to a single or a plurality of hexaluminate zones. Each dialuminate or hexaluminate zone is predominately or essentially single phase. The zones, referred to herein, may be single or polycrystalline. The zones may also be mixed compositionally, that is comprised of both dialuminate and hexaluminate crystallites. Phases, as herein defined, pertain to the composition, as either dialuminate or hexaluminate.

The structure can be a blend, laminate, or composite, and preferably comprises a calcium dialuminate of about 65-35% by weight, most preferably 50% by weight, and a corresponding calcium hexaluminate of about 35-65% by weight, most preferably 50% by weight.

Advantageously, the separate phases and crystallites are found to communicate by means of thermal and mechanical stress relief mechanisms. The communication may be by means of intercrystalline, intracrystalline, interphase, or intraphase mechanisms. It is found that this communication between the phases and crystallites enhances the thermal shock resistance.

A first embodiment, that of a blend structure, is comprised of calcium dialuminate and calcium hexaluminate phases. The phases of which consist essentially of a substantially homogeneous blend of a calcium oxide source and an aluminum oxide source of about 19-11% by weight calcium oxide and about 81-89% by weight aluminum oxide, wherein a single or a plurality of dialuminate zones are positionally juxtaposed to a single or a plurality of hexaluminate zones. These zones may be predominately comprised singly of either dialuminate or hexaluminate crystallites, or polycrystalline comprised of a combination of dialuminate and hexaluminate crystallites.

The dispersion of the crystallites in the blend embodiment is more homogeneous than the other embodiments. The finer dispersion of the blend lends itself to use in environments of lower temperatures and/or a higher number of cycles. The blend interphase, intraphase, intercrystalline, intracrystalline communication mechanisms may be a shorter distance. This may be due to smaller grain boundaries for each phase, thus reducing the available surface area per phase.

A second embodiment of the ceramic structure, a laminate, is comprised of calcium dialuminate and hexaluminate phases as a sintered ceramic comprising two bodies. A first body consisting essentially of about 22-19% by weight of calcium oxide and about 78-81% by weight aluminum oxide and a second body consisting essentially of about 11-8% by weight calcium oxide and about 89-92% by weight aluminum oxide. The first body and said second body are combined to form a unified body. The combination of the two bodies may be such that the bodies are intermingled to form a laminate structure. The laminate may be advantageously unified when the body is green and subsequently extruded providing a unified body with discontinuous striated laminations. The laminate may also be advantageously constructed as a true laminate, meaning that ribbons of each body be directed to lay one on the other in a manner to produce continuous laminated structures.

The laminated structure provides the structural upper limit of the contemplated ceramic structure, the blend structure representing the lower limit. Therefore, the laminate structure produces larger dialuminate and hexaluminate zones, thus providing larger zone boundaries than a blend structure. However, interphase, intraphase, intercrystalline, and intracrystalline communication remains an important property of the laminate structure. The communication between the individual structural units of the dialuminate and hexaluminate system divines the essence of the present invention.

A final embodiment of the ceramic structure, a composite, is comprised of calcium dialuminate and hexaluminate phases as a sintered ceramic comprising two bodies. A first body consisting essentially of about 22-19% by weight of calcium oxide and about 78-81% by weight aluminum oxide and a second body consisting essentially of about 11-8% by weight calcium oxide and about 89-92% by weight aluminum oxide. The first body is calcined and subsequently combined with said second body to form a unified body. This structure is best characterized as a composite structure with zones intermediate in size to the blend and laminate structure.

Interestingly, the dialuminate phase, in the composite, is calcined to produce a prereacted body that is subsequently mixed with the unreacted hexaluminate body. The consequence is to provide a structure wherein the dialuminate phase forms islands within the hexaluminate matrix. The hexaluminate matrix has a greater expansion than the dialuminate islands, therefore, when thermally stimulated, the matrix compresses the islands. The compression creates the strain which, thereby, provides the enhanced thermal properties. As can be readily apparent to those skilled in the art, calcining the hexaluminate phase simply reverses the roles of the dialuminate and hexaluminate of the phases in the composite structure. However, since it is the hexaluminate that possesses the higher expansion of the two crystallites, this embodiment is not preferred. If islands are comprised of the hexaluminate, the expansion experienced may eventually create cavities surrounding the islands.

Throughout the structures of the present invention, it is emphasized that there is a molecular communication between phases and crystallites. That the communication is vicinal is inherent, due to the properties of the grains and grain boundaries. This vicinal communication is obtained by the juxtaposition to which the various phases and crystallites conform. The mental exercise that must be wrought to appreciate the communication disclosed herein, is one where when either mechanical or thermal stress is applied to the ceramic, the individual dialuminate and hexaluminate zones and crystallites respond. The net effect of the response is the creation of a material that, due to the property mismatch, can survive in harsh environments.

It has been unearthed by the present invention, that the properties of the dialuminate complement the properties of the hexaluminate in thermally stressful environments. It has been found that cycling these ceramics may cause any one of the embodiments to blemish, but not to fail. For the purposes of providing a strident ceramic, therefore, the molecular communication between dialuminates and hexaluminates has been found to be very successful. The nearby interactions of the phases and crystals of the present invention produces a resilient ceramic structure and substance that can be advantageously used in some of the harshest thermal environments.

DETAILED DESCRIPTION OF THE INVENTION

The present invention is based, at least in part, on the surprising finding that structures having such advantageous properties as relatively low thermal expansion, high strength, and good thermal shock resistance over wide temperature ranges can be prepared from specific calcium oxide and aluminum oxide mixtures. The novel calcium dialuminate and hexaluminate blends, laminates and composites can be employed in numerous applications which require such a combination of property characteristics.

According to the first embodiment of the present invention, the blended calcium dialuminate/hexaluminate ceramics are prepared by admixing into a substantially homogeneous body, a calcium oxide source and an aluminum oxide source, in amounts equivalent to about 19–11% by weight calcium oxide and 81–89% by weight aluminum oxide, and a plasticizing agent. The resulting wet green body is then preferably shaped, dried, and then sintered, preferably at a temperature of about 1500°–1700° C., to form the desired blended ceramic product.

Various commercially available aluminas can be employed in the subject process as an aluminum oxide source, as will be apparent to those skilled in the art. A particularly useful alumina is Alcan ™ C-701 powder, available from Alcan Metal Powders Division, Elizabeth, N.J., a division of Alcan Aluminum Corporation, Cleveland, Ohio. Suitable calcium oxide sources include calcium carbonate, calcium oxalate and/or calcium dihydroxide powders. Calcium oxide can be employed in its pure state. However, as one skilled in the art would recognize, in this pure form it is highly reactive with water and thus difficult to both handle and store. Calcium difluoride powder can also be employed as a calcium oxide source if used in relatively small amounts, that is, in amounts equivalent to less than about 5% by weight of calcium oxide, and supplemented with a different calcium oxide source. Preferably, the calcium oxide source utilized in the subject process is calcium carbonate.

As noted above, the calcium oxide and aluminum oxide sources are combined in amounts equivalent to about 19–11% by weight calcium oxide and a corresponding 81–89% by weight aluminum oxide, based on total calcium oxide and aluminum oxide weight. According to the stoichiometry of the calcium oxide and aluminum oxide reaction and the phase relationships of calcia and alumina, such weight percentages are sufficient to yield, when sintered, a structure ranging from about 75–10% by weight calcium dialuminate and about 25–90% by weight calcium hexaluminate, based on total calcium dialuminate and hexaluminate in the body. Preferably, the calcium oxide amount equivalent is about 17–13% by weight and the aluminum oxide amount equivalent is about 83–87% by weight, respectively, an amount sufficient to yield, when sintered, a structure comprised of a calcium dialuminate weight percent of about 65–35% and a corresponding calcium hexaluminate weight percent of about 35–65%. Most preferably, the respective percent by weights are 15% and 85%, yielding, upon sintering, a structure of about 50% calcium dialuminate and 50% calcium hexaluminate.

In accordance with the present invention, the calcium and aluminum oxides described above are mixed with plasticizing agents (binders) to form wet green bodies. The function of the plasticizing agents is to assist in the formation of an unsintered and uncalcined agglomerated mass, referred to herein as a wet green body, which can then be shaped, extruded and/or molded, dried, and then sintered, as desired. The plasticizing agent should be such that it normally burns off at or before the sintering temperature of the subject process. Suitable plasticizing agents will be readily apparent to those skilled in the art and include, but are not limited to, epoxies, polyfurfuryl alcohol, silicone resins, or polyester resins, polycarbonates, polyethylene, unsaturated monomers such as poly(methyl methacrylate) or polystyrene, polyvinyl alcohol, or hydrated methyl cellulose. These and other suitable plasticizing agents are described in publications such as "Ceramics Processing Before Firing," ed. by George Y. Onoda, Jr. & L. L. Hench, John Wiley & Sons, N.Y.; "Study of Several Groups of Organic Binders Under Low-Pressure Extrusion," C. C. Treischel & E. W. Emrich, *Jour. Am. Cer. Soc.*, (29), pp. 129–132, 1946; "Organic (Temporary) Binders for Ceramic Systems," S. Levine, *Ceramic Age*, (75) No. 1, pp. 39+, January 1960; and "Temporary Organic Binders for Ceramic Systems" S. Levine, *Ceramic Age*, (75) No. 2 pp. 25+, February 1960, the disclosures of which are herein incorporated by reference. The preferred plasticizer is methyl cellulose, which is available as Meth-O-Cel ™ from the Dow Chemical Co., Midland, Mich.

The amount of plasticizer employed should be an amount which will cause the calcium and aluminum oxide powders to form an agglomerated mass. Normally about 2-60% by weight of plasticizer are used per 100% by weight of total oxides. As one skilled in the art would recognize, the preferable amount employed within this range is dependent upon the specific plasticizer used. For example, it is generally preferred to use only about 2-15% by weight, although when polyfurfuryl alcohol is employed, higher levels are sometimes necessary to thoroughly wet and agglomerate the oxides. Where methyl cellulose is employed, generally, levels at the lower end of the range are used. Suitable solvents may also be provided, as necessary, to disperse or dissolve the plasticizer and assist in the formation of the agglomeration. Generally, amounts of about 5-50% by weight of solvent per 100% by weight of total oxides are employed. Such solvents are conventional, and include water, in the case of methyl cellulose or polyvinyl alcohol as plasticizer, and in the case of silicone resin as plasticizer, isopropyl alcohol in combination with water. The most preferred plasticizing agent is methyl cellulose in a water solvent.

Additionally, if desired, a lubricant, preferably in an amount up to about 1% by weight based upon 100% by weight of calcium and aluminum oxides, may be employed to facilitate agglomeration, as well as to improve flow during extrusions. A suitable lubricant is sodium stearate. Additional lubricants will be readily apparent to those skilled in the art.

If desired, sintering agents can be added to the mix. Such agents serve to increase densification and strength, reduce porosity, and are generally added in amounts up to about 3% by weight based upon 100% by weight of calcium and aluminum oxides. Suitable sintering agents include, for example, $SiO_2$, $TiO_2$, SrO, BaO, $ZrO_2$, MgO, ZnO, NiO, $Cr_2O_3$, $MnO_2$, $Y_2O_3$, and $HfO_2$. Preferable sintering agents are $SiO_2$, $TiO_2$ and $Y_2O_3$. Most preferable sintering agents are $SiO_2$ and $TiO_2$.

The calcium and aluminum oxide sources and the plasticizing agent, as well as any other desired additives including those described above, are mixed into a homogeneous or substantially homogeneous blend using methods normally practiced in the ceramics art. Generally, dry ingredients are first premixed, and then combined with wet ingredients, and further mixed. Any conventional mixing equipment can be employed, however, the use of a mix muller is preferred. To effect further mixing, and to de-aerate, if desired, the batch can be transferred to the barrel of an extruder. The extruder is evacuated to remove air from the batch, and the batch extruded through a die one or more times. Ultimately, the batch is formed into the desired shape, using any one or more of various techniques readily apparent to those skilled in the art, such as shaping, extruding and or molding. Preferably, the batch is fashioned into the desired shape by extrusion through a die. Such resulting structures may include monoliths, honeycombs and slabs, as will be apparent to the skilled artisan.

The shaped wet green body is dried and then sintered. Sintering temperatures are preferably about 1500-1700° C., more preferably about 1650° C., for a period of about 2-10 hours to form the blended calcium dialuminate/hexaluminate ceramics of the invention.

The amount and type of sintering aid contributes to the porosity and, therefore, the density of the sintered structure. For example, addition of up to 1% by weight silica produces a highly dense structure. In the obverse, in the absence of a sintering aid, structures can be made which are highly porous. Porosity is additionally dependent upon the sintering temperature. For a corresponding increase in the sintering temperature, there is an increase in density.

The blended structures have a fine dispersion of a single or a plurality of dialuminate and hexaluminate crystallites, which are positionally juxtaposed. The fine dispersion is found to be a continuum of each phase homogeneously dispersed throughout the structure. The dispersion provides interphase and intraphase communication between the dialuminate and the hexaluminate phases and their respective crystallites. The communication is effected at times of thermal stress by microcracks, strains, and structural tension. The communication provides the beneficial enhancement observed in thermal shock properties.

The laminated calcium dialuminate/hexaluminate ceramic of the present invention can be prepared by intermingling at least two green bodies having different relative amounts of calcium oxide sources and aluminum oxide sources. This ceramic body provides, upon sintering, a laminated or intermingled structure having at least two components, each having different relative amounts of calcium dialuminate and calcium hexaluminate.

More particularly, the laminated bodies of this invention can be prepared by intermingling (i) at least one wet green body comprising a first relative amount of a calcium oxide source and an aluminum oxide source, and (ii) at least one wet green body comprising a calcium oxide source and an aluminum oxide source in a second relative amount different from said first amount. The relative amounts of calcium and aluminum oxide source materials in the sum of the intermingled green bodies should be sufficient to provide a total of about 19-11% by weight calcium oxide and about 81-89% by weight aluminum oxide. As noted above, according to the stoichiometry of the calcium oxide and aluminum oxide reaction and the phase relationships of calcia and alumina, such weight percentages are sufficient to yield, when sintered, a composition comprising a total calcium dialuminate content of 75-10% by weight and a corresponding calcium hexaluminate content of 25-90% by weight, based on total calcium dialuminate and hexaluminate.

With respect to the individual green bodies that are intermingled to form the laminates of this aspect of the invention, preferably, the relative amount of source material in the first green body is sufficient to provide about 22-19% by weight, more preferably about 22% by weight, calcium oxide, and about 78-81% by weight, more preferably about 78% by weight, aluminum oxide. Such relative amounts of source material are sufficient to provide, upon sintering, substantially all calcium dialuminate with substantially no hexaluminate crystallites. Preferably the relative amount of source material in the second green body is sufficient to provide about 11-8% by weight, more preferably about 8% by weight, calcium oxide, and about 89-92% by weight, more preferably about 92% by weight, aluminum oxide. Such amounts of source material are sufficient to provide, upon sintering, substantially all calcium hexaluminate with substantially no dialuminate.

The resulting intermingled wet green body is dried and then sintered, preferably at a temperature of about 1500-1700° C., more preferably 1650° C., to form the desired laminated ceramic structure.

The component wet green bodies intended for intermingling can be prepared using the aluminum and calcium oxide sources, the plasticizers and the additional ingredients, as desired, as well as the mixing techniques, described above. The intermingled wet green bodies can individually be of any size or shape, and can be of any composition, so long as the total of about 19-11% by weight calcium oxide and 81-89% by weight aluminum oxide is present among the total intermingled bodies. Intermingling can be carried out in a variety of ways, as will be evident to those skilled in the art. Preferably, following intermingling, some discernible first and second green body regions exist throughout the intermingled body. In preferred embodiments of the process, intermingling is carried out by layering, blending or beading and mixing.

In layering, the first and second wet green bodies are assembled by stacking, or layering one green body on top of another. Preferably, the first and second green bodies are initially separately extruded through a die into elongated shapes, most preferably of rectangular, hexagonal, or circular cross-sections. Preferably, the diameters of circular cross-sections are about 0.25-0.5 inch (6.35-12.7 mm). For square cross-sections, preferably the length of a side is about 0.25-0.5 inch (6.35-12.7 mm). Most preferably, both bodies are separately extruded into a single or a plurality of ribbons with a high width to thickness aspect ratio.

The extruded bodies are then assembled into a single laminate body by stacking the ribbons axially or longitudinally, one on top of another. Most preferably, the stacking results in substantially parallel placement of the ribbons. The first and second green bodies are preferably positioned to be uniformly or substantially uniformly distributed throughout the structure. To provide the preferable distribution, there will normally be a ratio of second bodies to first bodies of about 1 to 1. Preferably, the resultant layered wet green body is then passed, at least once, through an extruder to decrease the cross-sectional size of each of the layers.

The intermingling step of this embodiment of the invention can also be effected by blending. The differently composed green bodies are placed into a coarse blender. The resultant intermingled wet green body is then preferably passed through an extruder to further attenuate the different green body regions.

The intermingling step can also be effected by a beading and mixing operation in which the component green bodies are separately passed through an extruder, as described scribed above. The resultant elongated shapes are chopped into beads and mixed together. Preferably the beads have a size of about 0.125-0.25 inch (3.175-6.35 mm). The resultant intermingled body is then preferably passed through an extruder to cause further attenuation of the different green body regions.

The intermingled wet green bodies, however prepared, are dried and then sintered, as described above. The dynamic of the intermingled phases resides in the different thermal expansion properties and their proximate location within the intermingled structure. This structure produced a surprising result. An aggregate structural integrity is obtained that can withstand varying thermal shock stresses and maintain structural integrity. Due to the coefficient of thermal expansion mismatch between the two phases, which are positionally juxtaposed, thermal stresses will arise between the two phases resulting in either a strained region or microcrack region.

The relative position of the two phases to each other provides compensating stress and strain relief. When a first phase responds to a thermal stress the second phase responds in a compensating manner providing the observed beneficial effect. The laminate structures have a less fine dispersion of crystallites than that of the blend structure. One skilled in the art can appreciate that the dialuminate and hexaluminate zones in the laminate structure can be polycrystalline, with each zone comprising components of dialuminate and hexaluminate crystallites. The communication, therebetween, may be intercrystalline with the separate zones and intracrystalline within a zone, since zones may be polycrystalline. The communication is effective in a different thermal shock environment than that of the blends. The laminate structure would be more beneficial at higher temperatures with fewer cycles than that of the blends, whereas the blends would be beneficial in more cycles at lower temperatures or at lesser temperature differentials. The strained, microcracked, or combination of properties results in the enhancement of thermal shock properties.

In a further embodiment, the present invention provides the composite calcium dialuminate and hexaluminate ceramic and a process for their preparation. The composite structures are prepared by admixing (i) a particulate calcined mixture comprising a calcium oxide source and an aluminum oxide source in an amount equivalent to about 22-19% by weight calcium oxide and about 78-81% by weight aluminum oxide, the mixture having a mean particle size of about 20-200 microns, preferably 50-100 microns; with (ii) a calcium oxide source and an aluminum oxide source in amounts equivalent to about 11-8%, preferably 8%, by weight calcium oxide and about 89-92%, preferably 92%, by weight aluminum oxide; and (iii) a plasticizing agent.

The calcined particles are admixed with the uncalcined calcium and aluminum oxide sources in amounts such that the admixture contains in total about 19-11% by weight calcium oxide and a corresponding 81-89% by weight aluminum oxide, based on the total weights of the two oxides. The calcined particles themselves are composed of relative amounts of calcium oxide and aluminum oxide to provide, upon sintering, at least 75% by weight, preferably at least 90% by weight, calcium dialuminate. The resulting wet green body and ceramic particle mix is dried and then sintered preferably at temperatures of about 1500-1700° C., more preferably 1650° C., to form the desired composite ceramic structure.

Similar to the crystallite discontinuities observed in the intermingled laminate structure, the composite structure results in a single or a plurality of dialuminate crystallite islands within a matrix of hexaluminate crystallites and are, therefore, positionally juxtaposed. Both crystallite zones can be comprised of polycrystalline components of both dialuminate and hexaluminate crystallites. Communication within the structure of the composite may be both intercrystalline and intracrystalline, since both zones may be polycrystalline. The dispersion in the composite structure lies between that of the blends and the laminates. The same coefficient of thermal expansion mismatch between the two phases results in an enhanced thermal shock resistance whereby the aggregate thermal shock property exceeds the properties of the individual crystallites. The mechanism of interaction between the two phases and various zones is similar to the laminate structure due to the thermal expansion mismatch. This places the hexaluminate matrix in tension with the dialuminate islands, and vice versa, resulting in strain, microcracking, and/or some combination thereof or therebetween. The same beneficial results are obtained in the composite structure as those discovered for the laminate structures enhanced thermal shock properties.

The calcined particles can be prepared by admixing a calcium oxide source with an aluminum oxide source, such as the aluminum and calcium oxide sources described above. The particles are prepared using amounts equivalent to about 22–19%, preferably 22%, by weight calcium oxide and about 78–81%, preferably 78%, by weight aluminum oxide in the presence of plasticizing agents and additional ingredients, as desired, such as the lubricants and sintering agents described above. The mixture is then calcined, that is, heated to a sufficient temperature to drive off volatiles, but not to necessarily fully react the calcium and aluminum oxides, and then allowed to return to room temperature.

Such calcining can be carried out at temperatures of less than about 1300° C., preferably about 1200° C. Preferably, prior to calcining, the mix is mulled with insufficient water to plasticize, resulting in a damp granulated mix. The calcined mix is then pulverized to form coarse particulates with a mean particle size of about 20–200 microns, preferably 50–100 microns. Any conventional pulverization technique can be employed, but the use of a jaw crusher or disk pulverizer is preferred to attain the desired particle sizes.

The present invention produces novel calcium dialuminate and hexaluminate structures in the form of ceramic blends, laminates, and composites comprising 75–10% by weight calcium dialuminate, and a corresponding 25–90% by weight calcium hexaluminate, based on a 100% by weight calcium dialuminate and hexaluminate total. Preferably, the structures comprise about 65–35%, most preferably about 50%, by weight calcium dialuminate, and a corresponding 35–65%, most preferably about 50%, by weight calcium hexaluminate. The calcium dialuminate and calcium hexaluminates exist as discrete but cohesive crystalline phases in the subject compositions.

Microstructural analysis of the blend reveals that the dialuminate and hexaluminate crystallites may be randomly and intimately dispersed throughout the body matrix. Due to this random dispersion on mixing, complete microstructural homogeneity may not be achieved.

The laminate structure reveals individual regions at each zone, dialuminate and hexaluminate, wherein polycrystalline agglomerates of each phase can be found. The composite structure exhibits polycrystalline agglomerates or zones of dialuminate crystallites surrounded by a calcium hexaluminate matrix. The polycrystalline agglomerates exhibit larger surface areas of cohesive interactions of dialuminate and hexaluminate crystallites. These adhesive interactions result in higher stress and strain forces. Thereby enhancing thermal shock resistance.

The structures of the invention exhibit properties, such as relatively low thermal expansion, high strength and good thermal shock resistance over a wide temperature range, making them useful in a wide scope of applications, such as in filters for fluids generally, molten metal filters, heat exchangers, separation membranes, filters, diesel particulate filters, high temperature automotive and truck catalyst substrates, honeycomb substrates, and high temperature chemical reactors.

The structures generally possess a thermal expansion coefficient of about $70 \times 10^{-7}/°$ C. to about $55 \times 10^{-7}/°$ C., over temperature ranges of about 25° C. to about 900 C. The strength of the structures at 25° C., as measured by the modulus of rupture (MOR), is generally greater than about 7,500 pounds per square inch (psi), preferably greater than about 12,500 psi, and most preferably greater than about 17,500 psi. All structures exhibited high strengths, however, generally, the blends exhibited strengths higher than the composites which in turn had higher strengths than the laminates. This is speculated to be the result of the finer dispersion of the dialuminate and hexaluminate crystallites. In addition, the structures of the invention can resist significant dimensional changes and the resultant loss of strength following vigorous thermal cycling over broad temperature ranges.

Various aspects of the invention are illustrated by the following Examples. These Examples should not be construed as limiting the scope of the appended claims.

EXAMPLES

General Procedures for the Preparation of Calcium Dialuminate/Hexaluminate Structures The preparative process for each type of structure (blends, laminates and composites) consisted of the following basic steps: weighing the dry raw materials; dry mixing these materials; adding a water solvent in a mix muller until plastic; extruding for further mixing and de-aerating; final extrusion for shaping; drying the shaped article; and sintering. The dry ingredients employed included: alumina (Alcan ™ C-701), as an aluminum oxide source; $CaCO_3$, as a calcium oxide source; methyl cellulose (Meth-O-Cel ™), as a plasticizing agent; $SiO_2$ and $TiO_2$, as sintering agents; and sodium stearate as a lubricant. Water was employed as a solvent. The specifics of the preparation of the various blends, laminates and composites are described in more detail below.

A. Blends

The dry ingredients were weighed and placed into a plastic container. In the case of the $CaCO_3$, the weight was adjusted upward by a factor of 1.785 to reflect the desired weight equivalent of CaO. The weighed batch was then placed into a dry blender for ten minutes and the powders intimately blended. The blended batch was then placed into a mix muller. The muller at first provided more dry mixing. Water was then added slowly to the batch from a graduated cylinder through a nozzle to allow for good mixing. A batch of about 1000 g of dry powder generally required about 300 g of water. The final water level was adjusted to give a good plastic mix for extrusion and the batch mixed for a few additional minutes to develop the plasticity. Next, the resulting green body was transferred to the barrel of a ram-type extruder. The front end of the extruder included several small holes about ⅛" (3.175 mm). The batch was then extruded to further mix and de-aerate the wet green body. Specifically, the feed end of the extruder was closed creating a seal and a vacuum was pulled to remove the air from the batch. After the evacuation the ram was advanced to push the material through the die in the form of spaghetti. This procedure was repeated twice. Next, the die was changed to the ¼" (6.35 mm) size to form rods. The batch (spaghetti) was again placed into the barrel, the air was evacuated from the barrel and the spaghetti was then pushed through the die. The resulting rods were dried slowly in a hot air dryer, then cut into 3" (76.2 mm) lengths and sintered to the desired temperature. After sintering, the property measurements were made.

B. Laminates

Substantially the same batching procedure as employed for the blends was used to prepare the wet green bodies utilized in the laminate structures. However, in the case of laminates, two wet green bodies were made, one having one calcium to one aluminum oxide ratio, and another having a different calcium to aluminum oxide ratio. For the practice of the layering embodiment, following the mixing and de-aerating extrusion step, each of the wet green bodies was extruded for shaping through a ribbon die. The ribbons were then stacked in alternating layers, and the stack placed into an extruder and pushed through a ¼" (6.35 mm) rod die. As the material passed through the die, the layers were attenuated (thinned). Multiple passes continued to further attenuate the layers. The material was evaluated after two and four passes through the die, followed by drying and then firing.

For the practice of the beading/mixing embodiment, each of the two green body batches was extruded for shaping through a spaghetti die, the spaghetti chopped into beads, and the beads mixed. The mix was placed into the barrel of the extruder and extruded twice into ¼" (6.35 mm) rods. The rods were then sintered and tested.

C. Composites

The composites required pre-making a wet green body of a calcium dialuminate precursor, drying, calcining, and then crushing and screening the calcined body. Calcining was carried out at a temperature of about 1200° C. In the crushing and screening step, the particles were sized to provide a mean particle size of about 50–150 microns. The particles were then admixed with raw materials for a second batch at the desired level. The raw material and particle batch was then processed through dry blending, mulling, extruding, etc., in the same manner as the other blended structures, and the properties tested.

Various structures within the scope of the present invention were prepared and tested. The results of those tests are shown in the Examples and Tables which follow.

EXAMPLES 1–22

Blends were prepared as described in the General Procedures, using varying weight percents of aluminum oxide, and varying weight percents of the sintering agents $SiO_2$ and/or $TiO_2$, as indicated in the Tables. Meth-O-Cel TM and sodium stearate were added in amounts equal to 6% by weight and 0.5% by weight, respectively, based on 100% by weight calcium and aluminum oxides. Water was added in an amount equal to about 300 g. Sintering was then carried out at 1550° C.

Linear shrinkage upon sintering (shown as average percent shrinkage), and percent porosity and pore size (in microns) of the sintered compositions were measured. The coefficient of thermal expansion over the temperature range of about 25° C. to about 900° C. was measured, as was the modulus of rupture of the sintered compositions at room temperature. These determinations were carried out as follows. Linear shrinkage was determined using conventional measurement techniques. Porosity was measured by mercury penetration. The modulus of rupture was determined by supporting the sintered structure at two points along its length and applying a load to the structure midway between the two supports. The load was then gradually increased until the structure broke. The modulus of rupture was then calculated by the equation:

$$M = \frac{16 La}{3.14 d^3}$$

where "M" is modulus of rupture; "L" is the load applied at the time the structure breaks, in pounds; "a" is one-half the distance between the two supports, in inches; and "d" is the diameter of the sintered material, in inches or suitably converted to other units. Thermal shock resistance was measured by quenching the compositions, using water, from a temperature of about 300° C. to 900° C. and to a temperature of about 25° C. and measuring the strength of the composition as compared to compositions not subjected to such quenching. This procedure, generally termed the "Hasselman Test," is set forth in greater detail in Hasselman, *J. Am. Ceramic Soc.*, Vol. 53, No. 9, pp. 490–495 (1970) and Larson et al, *Trans. and J. British Ceramic Soc.*), Vol. 74, No. 2, pp. 59–65 (1975), herein incorporated by reference. The results are shown in Table I.

In the Tables which follow, a "-- " means that no determination of the particular parameter was made for that sample.

TABLE I

| Example | Wt % $Al_2O_3$ | Wt % CaO | Wt % $SiO_2$ | Wt % $TiO_2$ |
|---|---|---|---|---|
| 1 | 87.50 | 12.50 | 0.5 | 0.0 |
| 2 | 85.00 | 15.00 | 0.5 | 0.0 |
| 3 | 82.50 | 17.50 | 0.5 | 0.0 |
| 4 | 80.00 | 20.00 | 0.5 | 0.0 |
| 5 | 78.46 | 21.54 | 0.5 | 0.0 |
| 6 | 85.00 | 15.00 | 0.0 | 0.0 |
| 7 | 85.00 | 15.00 | 0.2 | 0.2 |
| 8 | 85.00 | 15.00 | 0.0 | 0.5 |
| 9 | 85.00 | 15.00 | 0.5 | 0.0 |
| 10 | 85.00 | 15.00 | 0.2 | 0.5 |
| 11 | 85.00 | 15.00 | 0.5 | 0.2 |
| 12 | 85.00 | 15.00 | 0.5 | 0.5 |
| 13 | 85.00 | 15.00 | 1.0 | 0.5 |
| 14 | 85.00 | 15.00 | 0.2 | 1.0 |
| 15 | 85.00 | 15.00 | 0.5 | 1.0 |
| 16 | 85.00 | 15.00 | 1.0 | 0.5 |
| 17 | 85.00 | 15.00 | 1.0 | 0.2 |
| 18 | 85.00 | 15.00 | 1.0 | 0.0 |
| 19 | 85.00 | 15.00 | 1.0 | 1.0 |
| 20 | 85.00 | 15.00 | 0.20 | 0.0 |
| 21 | 85.00 | 15.00 | 0.00 | 0.2 |
| 22 | 85.00 | 15.00 | 0.10 | 0.1 |

| Example | Avg % Shrinkage | Avg MOR (psi) | % Porosity | Pore Size (μ) | CTE ($\times 10^{-7}$) |
|---|---|---|---|---|---|
| 1 | 9.660 | 7800 | 27.6 | 1.980 | 68.4 |
| 2 | 13.080 | 9440 | 23.5 | 1.960 | 61.5 |
| 3 | 14.030 | 9990 | 17.6 | 1.930 | 56.0 |
| 4 | 13.320 | 8610 | 20.1 | 3.500 | 53.0 |
| 5 | 12.696 | 9810 | 17.5 | 2.400 | 53.0 |
| 6 | −2.080 | 2835 | 53.5 | 2.140 | 62.0 |
| 7 | 14.180 | 17750 | 17.6 | 1.930 | 56.0 |
| 8 | 15.290 | 13850 | 9.6 | 0.342 | 65.5 |
| 9 | 16.950 | 19450 | 2.2 | 0.242 | 68.2 |
| 10 | 16.200 | 17950 | 2.3 | 0.276 | 67.4 |
| 11 | 16.010 | 19160 | 3.4 | 0.104 | 66.0 |

TABLE I-continued

| | | | | | |
|---|---|---|---|---|---|
| 12 | 17.020 | 19550 | 2.0 | 0.893 | 66.8 |
| 13 | 17.250 | 21000 | 2.3 | 1.957 | 67.0 |
| 14 | 18.750 | 18100 | 1.9 | 2.892 | 55.9 |
| 15 | 17.145 | 17000 | 2.0 | 1.383 | 69.7 |
| 16 | 16.720 | 16650 | 2.4 | 0.449 | 70.5 |
| 17 | 17.035 | 20000 | 2.7 | 0.400 | 69.5 |
| 18 | 15.030 | 18250 | 5.5 | 0.168 | 67.3 |
| 19 | 16.850 | 13200 | 4.7 | 0.019 | 69.0 |
| 20 | 9.50 | 11300 | — | — | 65.9 |
| 21 | 5.62 | 5570 | — | — | 62.4 |
| 22 | 8.45 | 11600 | — | — | 66.0 |

EXAMPLES 23-44

Blends were prepared and tested, substantially as described in Examples 1-22, except that the sintering step was carried out at 1600° C.

The results are shown in Table II.

TABLE II

| Example | Wt % $Al_2O_3$ | Wt % CaO | Wt % $SiO_2$ | Wt % $TiO_2$ |
|---|---|---|---|---|
| 23 | 87.50 | 12.50 | 0.5 | 0.0 |
| 24 | 85.00 | 15.00 | 0.5 | 0.0 |
| 25 | 82.50 | 17.50 | 0.5 | 0.0 |
| 26 | 80.00 | 20.00 | 0.5 | 0.0 |
| 27 | 78.46 | 21.54 | 0.5 | 0.0 |
| 28 | 85.00 | 15.00 | 0.0 | 0.0 |
| 29 | 85.00 | 15.00 | 0.2 | 0.2 |
| 30 | 85.00 | 15.00 | 0.0 | 0.5 |
| 31 | 85.00 | 15.00 | 0.5 | 0.0 |
| 32 | 85.00 | 15.00 | 0.2 | 0.5 |
| 33 | 85.00 | 15.00 | 0.5 | 0.2 |
| 34 | 85.00 | 15.00 | 0.5 | 0.5 |
| 35 | 85.00 | 15.00 | 0.0 | 1.0 |
| 36 | 85.00 | 15.00 | 0.2 | 1.0 |
| 37 | 85.00 | 15.00 | 0.5 | 1.0 |
| 38 | 85.00 | 15.00 | 1.0 | 0.5 |
| 39 | 85.00 | 15.00 | 1.0 | 0.2 |
| 40 | 85.00 | 15.00 | 1.0 | 0.0 |
| 41 | 85.00 | 15.00 | 1.0 | 1.0 |
| 42 | 85.00 | 15.00 | 0.20 | 0.0 |
| 43 | 85.00 | 15.00 | 0.00 | 0.2 |
| 44 | 85.00 | 15.00 | 0.10 | 0.1 |

| Example | Avg % Shrinkage | Avg MOR (psi) | % Porosity | Pore Size ($\mu$) | CTE ($\times 10^{-7}$) |
|---|---|---|---|---|---|
| 23 | 14.02 | 15050 | 21.9 | 1.9 | 71.0 |
| 24 | 16.44 | 16750 | 14.5 | 1.2 | 65.1 |
| 25 | 17.04 | 14250 | 39.4 | 6.3 | 59.3 |
| 26 | 16.72 | 11600 | 14.2 | 2.5 | 55.5 |
| 27 | 15.94 | 14450 | 8.0 | 3.5 | 52.9 |
| 28 | 0.80 | 3145 | 48.7 | 2.2 | — |
| 29 | 17.63 | 23300 | 0.0 | 0.0 | 68.1 |
| 30 | 17.94 | 22150 | — | — | — |
| 31 | 17.79 | 24250 | — | — | — |
| 32 | 16.85 | 20500 | — | — | — |
| 33 | 16.42 | 20900 | — | — | — |
| 34 | 17.49 | 15150 | 0.0 | 0.0 | — |
| 35 | 17.17 | 21150 | 3.6 | 1.4 | — |
| 36 | 18.68 | 17600 | 3.6 | 1.9 | — |
| 37 | 17.17 | 16150 | — | — | — |
| 38 | 16.62 | 17000 | — | — | — |
| 39 | 16.93 | 19650 | — | — | — |
| 40 | 15.88 | 21600 | 2.8 | 0.5 | — |
| 41 | 17.34 | 14600 | 2.5 | 11.8 | — |
| 42 | 14.87 | 18900 | 12.1 | 0.86 | — |
| 43 | 11.48 | 13300 | 18.1 | 1.26 | — |
| 44 | 14.84 | 20450 | 5.8 | 0.36 | — |

EXAMPLES 45-64

Blends were prepared and tested, substantially as described in Examples 1-22, except that the sintering step was carried out at 1650° C.

The results are shown in Table III.

TABLE III

| Example | Wt % $Al_2O_3$ | Wt % CaO | Wt % $SiO_2$ | Wt % $TiO_2$ |
|---|---|---|---|---|
| 45 | 87.50 | 12.50 | 0.5 | 0.0 |
| 46 | 85.00 | 15.00 | 0.5 | 0.0 |
| 47 | 82.50 | 17.50 | 0.5 | 0.0 |
| 48 | 80.00 | 20.00 | 0.5 | 0.0 |
| 49 | 78.46 | 21.54 | 0.5 | 0.0 |
| 50 | 85.00 | 15.00 | 0.0 | 0.0 |
| 51 | 85.00 | 15.00 | 0.2 | 0.2 |
| 52 | 85.00 | 15.00 | 0.5 | 0.0 |
| 53 | 85.00 | 15.00 | 0.5 | 0.2 |
| 54 | 85.00 | 15.00 | 0.5 | 0.5 |
| 55 | 85.00 | 15.00 | 0.0 | 1.0 |
| 56 | 85.00 | 15.00 | 1.0 | 0.0 |
| 57 | 85.00 | 15.00 | 1.0 | 1.0 |
| 58 | 85.00 | 15.00 | 0.20 | 0.0 |
| 59 | 85.00 | 15.00 | 0.00 | 0.2 |
| 60 | 85.00 | 15.00 | 0.10 | 0.1 |
| 61 | 80.00 | 20.00 | 0.20 | 0.0 |
| 62 | 80.00 | 20.00 | 0.00 | 0.2 |
| 63 | 80.00 | 20.00 | 0.10 | 0.1 |
| 64 | 78.70 | 38.02 | 0.05 | 0.0 |

| Example | Avg % Shrinkage | Avg MOR (psi) | % Porosity | Pore Size ($\mu$) | CTE ($\times 10^{-7}$) |
|---|---|---|---|---|---|
| 45 | — | 17600 | — | — | 70.9 |
| 46 | — | 17100 | — | — | 63.8 |
| 47 | — | 18200 | — | — | — |

TABLE III-continued

| | | | | | |
|---|---|---|---|---|---|
| 48 | — | 16550 | — | — | 57.4 |
| 49 | — | 16600 | — | — | 50.8 |
| 50 | — | 4890 | — | — | 62.5 |
| 51 | — | 26600 | — | — | 66.1 |
| 52 | — | 22750 | — | — | 67.0 |
| 53 | — | 21500 | — | — | — |
| 54 | — | 22880 | — | — | 68.5 |
| 55 | — | 19450 | — | — | 68.2 |
| 56 | — | 19900 | — | — | 67.2 |
| 57 | — | 18050 | — | — | 68.9 |
| 58 | 17.32 | 23200 | 0.0 | 0.00 | 65.7 |
| 59 | 15.08 | 16850 | — | — | 61.5 |
| 60 | 16.97 | 22650 | — | — | 67.6 |
| 61 | — | 19400 | — | — | 55.8 |
| 62 | — | 17900 | — | — | 57.1 |
| 63 | — | 18750 | — | — | 58.2 |
| 64 | — | 8905 | 21.1 | 2.60 | 47.5 |

EXAMPLES 65-84

Blends were prepared and tested, substantially as described in Examples 1-22, except that the sintering step was carried out at 1700° C.

The results are shown in Table IV.

TABLE IV

| Example | Wt % $Al_2O_3$ | Wt % CaO | Wt % $SiO_2$ | Wt % $TiO_2$ |
|---|---|---|---|---|
| 65 | 87.50 | 12.50 | 0.5 | 0.0 |
| 66 | 85.00 | 15.00 | 0.5 | 0.0 |
| 67 | 82.50 | 17.50 | 0.5 | 0.0 |
| 68 | 80.00 | 20.00 | 0.5 | 0.0 |
| 69 | 78.46 | 21.54 | 0.5 | 0.0 |
| 70 | 85.00 | 15.00 | 0.0 | 0.0 |
| 71 | 85.00 | 15.00 | 0.2 | 0.2 |
| 72 | 85.00 | 15.00 | 0.5 | 0.0 |
| 73 | 85.00 | 15.00 | 0.5 | 0.5 |
| 74 | 85.00 | 15.00 | 0.0 | 1.0 |
| 75 | 85.00 | 15.00 | 0.2 | 1.0 |
| 76 | 85.00 | 15.00 | 1.0 | 0.0 |
| 77 | 85.00 | 15.00 | 1.0 | 1.0 |
| 78 | 85.00 | 15.00 | 0.20 | 0.0 |
| 79 | 85.00 | 15.00 | 0.00 | 0.2 |
| 80 | 85.00 | 15.00 | 0.10 | 0.1 |
| 81 | 80.00 | 20.00 | 0.20 | 0.0 |
| 82 | 80.00 | 20.00 | 0.00 | 0.2 |
| 83 | 80.00 | 20.00 | 0.10 | 0.1 |
| 84 | 78.70 | 38.02 | 0.05 | 0.0 |

| Example | Avg % Shrinkage | Avg MOR (psi) | % Porosity | Pore Size (μ) | CTE (x$10^{-7}$) |
|---|---|---|---|---|---|
| 65 | — | 20350 | 8.1 | 0.235 | 69.0 |
| 66 | — | 18550 | 5.8 | 0.120 | 60.5 |
| 67 | — | 17350 | 3.5 | 0.058 | 60.2 |
| 68 | — | 18650 | 2.5 | 1.140 | 54.5 |
| 69 | — | 17350 | 3.3 | 11.700 | 53.9 |
| 70 | — | 7890 | 34.4 | 2.200 | 58.3 |
| 71 | — | 24050 | 3.4 | 11.300 | 67.3 |
| 72 | — | 24600 | 2.1 | 0.950 | 67.1 |
| 73 | — | 21050 | 3.9 | 0.014 | 67.3 |
| 74 | — | 21550 | 1.9 | 1.800 | 67.3 |
| 75 | — | 18250 | 3.2 | 2.700 | 64.7 |
| 76 | — | 19400 | 2.0 | 1.265 | 69.4 |
| 77 | — | 14850 | 5.9 | 0.546 | 67.2 |
| 78 | — | — | 2.2 | 5.700 | 68.1 |
| 79 | — | — | 2.5 | 1.290 | 66.4 |
| 80 | — | — | 3.8 | 0.740 | 66.1 |
| 81 | — | 17450 | 0.0 | 0.000 | 55.0 |
| 82 | — | 13600 | 2.0 | 0.069 | 53.3 |
| 83 | — | 17900 | 1.9 | 1.060 | 53.8 |
| 84 | — | 16000 | 4.0 | 1.800 | 54.1 |

EXAMPLES 85-88

Laminates in a layered form, were prepared as substantially described in the General Procedures. Specifically, a first green body was prepared by mixing about 8.35% by weight calcium oxide and about 91.62% by weight aluminum oxide with $SiO_2$ (0.5% by weight), Meth-O-Cel ™ (6% by weight), sodium stearate (0.5% by weight) and water (300 g). A second green body was prepared by mixing about 21.25% by weight calcium oxide and 78.75% by weight aluminum oxide, and $SiO_2$, Meth-0-Cel ™, sodium stearate and water in amounts substantially the same as the first green body. The two green bodies were each separately shaped by extrusion through a die into 0.25-inch (6.35 mm) ribbons which were then stacked, or layered, one on top of the other in an alternate fashion. The layered green body was then passed through a 0.25-inch (6.35 mm) rod die, either two or four times, dried and then sintered at either 1550° C. or 1600° C., as indicated, and the property characteristics tested.

The results are shown in Table V.

TABLE V

| Example | # of Extrusions | Sintering Temp.(°C.) |
|---|---|---|
| 85 | 2 | 1550 |
| 86 | 4 | 1550 |
| 87 | 2 | 1600 |
| 88 | 4 | 1600 |

| Example | Avg % Shrinkage | Avg MOR (psi) | % Porosity | Pore Size (μ) | CTE (x$10^{-7}$) |
|---|---|---|---|---|---|
| 85 | 11.240 | 10900 | 12.3 | 0.975 | 64.3 |
| 86 | 13.770 | 19350 | 13.8 | 1.046 | 67.8 |
| 87 | 14.16 | 15950 | — | — | 76.3 |
| 88 | 15.21 | 20550 | — | — | 68.7 |

EXAMPLES 89-90

Laminates in a beaded/mixed form were prepared as substantially described in Examples 85-88, except that the first and second green bodies were chopped into beads following the separate extrusion steps. The beads were then mixed together and the mixture was passed twice through a 0.25-inch rod die, dried and then sintered at 1550° C. or 1600° C., as indicated, and the property characteristics tested.

The results are shown in Table VI.

TABLE VI

| Example | Sintering Temp.(°C.) |
|---|---|
| 89 | 1550 |
| 90 | 1600 |

| Example | Avg % Shrinkage | Avg MOR (psi) | % Porosity | Pore Size (μ) | CTE (x$10^{-7}$) |
|---|---|---|---|---|---|
| 89 | 11.560 | 13300 | 13.3 | 0.924 | 64.5 |
| 90 | 14.15 | 15650 | — | — | 67.8 |

EXAMPLES 91-95

Composites were prepared substantially as described in the General Procedures. Specifically, a calcined particle was prepared by mixing 8.35% by weight calcium oxide and 91.62% by weight aluminum oxide with and $SiO_2$ (0.5% by weight), sodium stearate (0.5% by weight), Meth-O-Cel ™ 6% by weight), and Water (200 g) followed by calcining at a temperature of about 1200° C. To this was added the indicated amounts of calcium and aluminum oxide, and $SiO_2$ (0.25% by weight), sodium stearate (0.5% by weight), Meth-O-Cel ™ (6% by weight) and water (300 g). The wet green body and ceramic mixture was then sintered at the temperatures indicated, and the property characteristics tested.

The results are shown in Table VII.

TABLE VII

| Example | Wt % Particle | Wt % Al₂O₃ | Wt % CaO |
|---|---|---|---|
| 91 | 50.0 | 45.81 | 4.19 |
| 92 | 10.0 | 82.46 | 7.54 |
| 93 | 20.0 | 73.30 | 6.71 |
| 94 | 50.0 | 45.81 | 4.19 |
| 95 | 10.0 | 82.46 | 7.54 |

| Example | Sintering Temp.(°C.) | Avg MOR (psi) | % Porosity | Pore Size (μ) |
|---|---|---|---|---|
| 91 | 1650 | 20900 | — | — |
| 92 | 1650 | 14550 | 19.8 | 1.50 |
| 93 | 1650 | 16750 | 14.5 | 1.25 |
| 94 | 1700 | 19100 | 1.6 | 0.092 |
| 95 | 1700 | 18450 | 9.1 | 0.280 |

EXAMPLES 96–99

Thermal Cycling Test

Several compositions, prepared as indicated, were cycle tested to determine if there would be any dimensional change due to microcrack propagation. The test involved placing the samples into a furnace at 1200° C. for 10 minutes, lowering the hearth to allow cooling for 10 minutes, then raising the hearth back into the furnace and repeating the cycle. In cooling, the temperature of the composition reached about 200° C. If the material was subject to degradation, the test should reveal changes both in the dimensions and thermal expansion after a few cycles. The samples tested showed no measurable dimensional change and no significant change in thermal expansion.

TABLE IX

| | | Thermal Expansion x 10⁻⁷ / °C. | | |
|---|---|---|---|---|
| Example | Sample | As Fired | 72 Cycles | 408 Cycles |
| 96 | See Example 26 | 55.9 | 55.5 | 54.5 |
| 97 | See Example 29 | 65.8 | 67.7 | 66.0 |
| 98 | See Example 88 | 69.6 | 69.0 | 71.4 |
| 99 | See Example 90 | 66.6 | 67.9 | 64.8 |

I claim:

1. A structure comprised of calcium dialuminate and calcium hexaluminate crystalline phases of about 75–10% by weight calcium dialuminate and about 25–90% by weight calcium hexaluminate, wherein a single or a plurality of dialuminate zones are positionally juxtaposed to a single or a plurality of hexaluminate zones.

2. The structure of claim 1 wherein said phases are comprised of about 65–35% by weight calcium dialuminate and about 35–65% by weight calcium hexaluminate.

3. The structure of claim 1 wherein said phases are comprised of about 50% by weight calcium dialuminate and about 50% by weight calcium hexaluminate.

4. The structure of claim 1 wherein said structure is a blend, a laminate, or a composite wherein comprised of a single or a plurality of communicating dialuminate crystalline zones and hexaluminate crystalline zones, wherein said communication is intercrystalline or intracrystalline.

5. The structure of claim 1 wherein said dialuminate or hexaluminate phases are polycrystalline comprising a single or a plurality of dialuminate crystallites and a single or a plurality of hexaluminate crystallites.

6. The structure of claim 1 wherein said phases are strained thereby enhancing thermal shock resistance.

7. A structure comprised of calcium dialuminate and calcium hexaluminate phases of about 75–10% by weight calcium dialuminate and about 25–90% by weight calcium hexaluminate, said structure being produced by sintering a substantially homogeneous blend of a calcium oxide source and an aluminum oxide source of about 11–19% by weight calcium oxide and about 81–89% by weight aluminum oxide, wherein a single or a plurality of dialuminate zones are positionally juxtaposed to a single or a plurality of hexaluminate zones.

8. The structure of claim 7 wherein said structure is a honeycomb.

9. The structure of claim 7 wherein said blend consists essentially of about 17–13% by weight calcium oxide and about 83–87% by weight aluminum oxide.

10. The structure of claim 7 wherein said blend consists essentially of about 15% by weight calcium oxide and about 85% by weight aluminum oxide.

11. The structure of claim 7 wherein said dialuminate crystallite communicates with said hexaluminate crystallite.

12. A structure comprised of calcium dialuminate and hexaluminate phases of about 75–10% by weight calcium dialuminate and about 25–90% by weight calcium hexaluminate as a sintered ceramic wherein the sintered ceramic is produced by sintering
a first body consisting essentially of about 22–19% by weight of calcium oxide and about 78–81% by weight aluminum oxide,
a second body consisting essentially of about 11–8% by weight of calcium oxide and about 89–92% by weight aluminum oxide,
wherein said first body and said second body are combined to form a unified body wherein said unified body comprises a single or a plurality of a first zone of said first body and a single or a plurality of a second zone of said second body.

13. The structure of claim 12 wherein said first body consists essentially of about 22% by weight calcium oxide and about 78% by weight aluminum oxide and said second body consists essentially of about 8% calcium oxide and about 92% aluminum oxide.

14. The structure of claim 12 wherein said first and second body are shaped in the form of a single or a plurality of ribbons.

15. The structure of claim 14 wherein said ribbons are intermingled to form a laminate structure.

16. The structure of claim 12 wherein a single or a plurality of said first zones communicate with a single or a plurality of said second zones.

17. The structure of claim 12 wherein said single or plurality of said first and second zones are positionally juxtaposed.

18. The structure of claim 12 wherein said first and second zones are polycrystalline comprised of dialuminate or hexaluminate crystallites.

19. A structure comprised of calcium dialuminate and hexaluminate phases of about 75–10% by weight calcium dialuminate and about 25–90% by weight calcium hexaluminate as a sintered ceramic, wherein the sintered ceramic is produced by sintering two bodies,
a first body consisting essentially of about 22–19% by weight of calcium oxide and about 78–14 81% by weight aluminum oxide, a second body consisting essentially of about 11-8% by weight calcium oxide and about 89-92% by weight aluminum oxide,
wherein said first body is calcined and subsequently combined with said second body to form a unified body.

20. The structure of claim 19 wherein said first body consists essentially of about 22% by weight of a calcium oxide source and of about 78% by weight of an aluminum oxide source and said second body consists essentially of about 8% by weight of a calcium oxide source and about 92% by weight of an aluminum oxide source.

21. The structure of claim 19 wherein said first body forms a calcium dialuminate phase of crystallite islands in said second body, wherein said second body forms a matrix of a calcium hexaluminate phase.

22. The structure of claim 19 wherein said dialuminate phase is comprised of a single or a plurality of dialuminate crystallites and said hexaluminate phase is comprised of a single or a plurality of hexaluminate crystallites.

23. The structure of claim 19 wherein said calcined first body is in the shape of calcined particles having a mean particle size of about 20-200 microns.

24. The structure of claim 21 wherein said single or plurality of dialuminate islands communicate with the hexaluminate matrix.

25. The structure of claim 19 wherein said dialuminate and hexaluminate phases are positionally juxtaposed.

26. The structure of claim 19 wherein said dialuminate phase communicates with said hexaluminate phase.

27. The structure of claim 22 wherein said dialuminate crystallites communicate with said hexaluminate crystallites.

28. The structure of claim 1 which is in a honeycomb shape.

29. A method for producing calcium dialuminate and hexaluminate ceramic structures comprising:
 (a) admixing a calcium oxide source and an aluminum oxide source of about 11-19% by weight calcium oxide and about 81-89% by weight aluminum oxide, based on the total weight of the calcium and aluminum oxides, with a suitable amount of a plasticizing agent to form a wet green body; and
 (b) drying and then sintering said body at temperatures of about 1500-1700° C. for a period of about 2-10 hours to form a structure comprising 75-25% by weight calcium dialuminate and 25-75% by weight calcium hexaluminate crystallites.

30. The method of claim 29 wherein a sintering aid is admixed with said body.

31. The method of claim 29 wherein a lubricant is admixed with said body.

32. The structure of claim 1 wherein said structure is a molten metal filter.

33. The structure of claim 1 wherein said structure is a diesel particulate filter.

34. The structure of claim 1 wherein said structure is a heat exchanger.

35. The structure of claim 1 wherein said structure is a catalytic substrate.

36. The structure of claim 1 wherein said structure is a separation membrane.

37. A structure consisting essentially of calcium dialuminate and calcium hexaluminate crystalline phases of about 75-10% by weight calcium dialuminate and about 25-90% by weight calcium hexaluminate, wherein a single or a plurality of dialuminate zones are positionally juxtaposed to a single or a plurality of hexaluminate zones.

38. A structure consisting essentially of calcium dialuminate and calcium hexaluminate phases of about 75-10% by weight calcium dialuminate and about 25-90% by weight calcium hexaluminate, said structure being produced by sintering a substantially homogeneous blend of a calcium oxide source and an aluminum oxide source of about 11-19% by weight calcium oxide and about 81-89% by weight aluminum oxide, wherein a single or a plurality of dialuminate zones are positionally juxtaposed to a single or a plurality of hexaluminate zones.

39. A structure consisting essentially of calcium dialuminate and hexaluminate phases of about 75-10% by weight calcium dialuminate and about 25-90% by weight calcium hexaluminate as a sintered ceramic, wherein the sintered ceramic is produced by sintering two bodies,
 a first body consisting essentially of about 22-19% by weight of calcium oxide and about 78-81% by weight aluminum oxide,
 a second body consisting essentially of about 11-8% by weight calcium oxide and about 89-92% by weight aluminum oxide,
 wherein said first body and said second body are combined to form a unified body wherein said unified body comprises a single or a plurality of a first zone of said first body and a single or a plurality of a second zone of said second body.

40. A structure consisting essentially of calcium dialuminate and hexaluminate phases of about 75-10% by weight calcium dialuminate and about 25-90% by weight calcium hexaluminate as a sintered ceramic, wherein the sintered ceramic is produced by sintering two bodies,
 a first body consisting essentially of about 22-19% by weight of calcium oxide and about 78-81% by weight aluminum oxide,
 a second body consisting essentially of about 11-8% by weight calcium oxide and about 89-92% by weight aluminum oxide,
 wherein said first body is calcined and subsequently combined with said second body to form a unified body.

41. A method for producing calcium dialuminate and hexaluminate ceramic structures consisting essentially of:
 (a) admixing a calcium oxide source and an aluminum oxide source of about 11-19% by weight calcium oxide and about 81-89% by weight aluminum oxide, based on the total weight of the calcium and aluminum oxides, with a suitable amount of a plasticizing agent to form a wet green body; and
 (b) drying and then sintering said body at temperatures of about 1500-1700° C. for a period of about 2-10 hours to form a structure comprising 75-25% by weight calcium dialuminate and 25-75% by weight calcium hexaluminate crystallites.

* * * * *

UNITED STATES PATENT AND TRADEMARK OFFICE
CERTIFICATE OF CORRECTION

PATENT NO.   : 4,960,737

DATED        : October 2, 1990

INVENTOR(S)  : Donald L. Guile and Dandy Martin

It is certified that error appears in the above-identified patent and that said Letters Patent is hereby corrected as shown below:

Column 7, line 50, omit -- scribed --.

Column 10, line 62, before "several", add -- a die with --.

Column 18, Claim 12, line 30, after "sintering", should read -- two bodies,--.

Column 18, Claim 19, line 67, -- 78-14 81% -- should read -- 78-81% --.

Signed and Sealed this

Twenty-second Day of December, 1992

Attest:

DOUGLAS B. COMER

Attesting Officer    Acting Commissioner of Patents and Trademarks